(12) United States Patent
Banerjee et al.

(10) Patent No.: US 11,635,342 B2
(45) Date of Patent: Apr. 25, 2023

(54) BUILDING TYPE CLASSIFICATION

(71) Applicant: Phyn LLC, Torrance, CA (US)

(72) Inventors: Salil P. Banerjee, Lynchburg, VA (US); Babak Abbasi Bastami, Seattle, WA (US)

(73) Assignee: Phyn LLC, Torrance, CA (US)

( * ) Notice: Subject to any disclaimer, the term of this patent is extended or adjusted under 35 U.S.C. 154(b) by 1002 days.

(21) Appl. No.: 16/272,233

(22) Filed: Feb. 11, 2019

(65) Prior Publication Data
US 2019/0250064 A1  Aug. 15, 2019

Related U.S. Application Data

(60) Provisional application No. 62/631,085, filed on Feb. 15, 2018.

(51) Int. Cl.
| | | |
|---|---|---|
| *G01M 3/28* | (2006.01) | |
| *G06F 16/901* | (2019.01) | |
| *G06F 16/906* | (2019.01) | |
| *G01M 3/24* | (2006.01) | |
| *E03B 7/07* | (2006.01) | |

(52) U.S. Cl.
CPC .......... *G01M 3/2815* (2013.01); *G01M 3/243* (2013.01); *G06F 16/906* (2019.01); *G06F 16/9024* (2019.01); *E03B 7/07* (2013.01)

(58) Field of Classification Search
CPC . G01M 3/2815; G01M 3/243; G06F 16/9024; G06F 16/906; E03B 7/07
See application file for complete search history.

(56) References Cited

U.S. PATENT DOCUMENTS

| | | |
|---|---|---|
| 6,839,644 B1 | 1/2005 | Woods et al. |
| 6,840,090 B2 | 1/2005 | Smith |
| 9,923,971 B2 | 3/2018 | Madey et al. |

(Continued)

FOREIGN PATENT DOCUMENTS

| | | |
|---|---|---|
| CN | 103032626 A | 4/2013 |
| CN | 203745212 U | 7/2014 |

(Continued)

OTHER PUBLICATIONS

U.S. Appl. No. 62/611,187, filed Dec. 28, 2017, all pages.

(Continued)

*Primary Examiner* — Tarun Sinha
*Assistant Examiner* — Lal C Mang
(74) *Attorney, Agent, or Firm* — Kilpatrick Townsend & Stockton LLP

(57) ABSTRACT

A method of identifying a type of plumbing system of a building is provided. The method includes determining a spectral energy ratio as a function of first pressure data acquired during a first time period in which a water flow through a plumbing system of a building is below a threshold. The method also includes determining a multimodal test value as a function of second pressure data acquired during a second time period that includes at least some time during which the water flow through the plumbing system is greater than or equal to the threshold. Further, the method includes identifying a type of the plumbing system of the building as a function of the spectral energy ratio and the multimodal test value.

15 Claims, 17 Drawing Sheets

(56) References Cited

U.S. PATENT DOCUMENTS

| | | |
|---|---|---|
| 10,094,095 B2 | 10/2018 | Enev et al. |
| 2008/0266125 A1* | 10/2008 | Windisch ............... G08B 21/00 |
| | | 340/605 |
| 2010/0313958 A1 | 12/2010 | Patel et al. |
| 2017/0044744 A1 | 2/2017 | Everhart |
| 2017/0060148 A1* | 3/2017 | Jebran ................ G05D 23/1353 |
| 2017/0122829 A1* | 5/2017 | Skalleback ........... G01L 19/086 |
| 2017/0131174 A1* | 5/2017 | Enev .................. G01M 3/2815 |
| 2017/0186291 A1* | 6/2017 | Wenus ............. E08B 13/19608 |
| 2017/0285665 A1 | 10/2017 | Nunally et al. |
| 2018/0045599 A1* | 2/2018 | Larach ................ G01M 3/2815 |
| 2018/0094415 A1 | 4/2018 | Slate |
| 2018/0127957 A1* | 5/2018 | Enev ....................... E03B 7/071 |

FOREIGN PATENT DOCUMENTS

| | | |
|---|---|---|
| CN | 104536001 A | 4/2015 |
| CN | 204330231 U | 5/2015 |
| CN | 104896310 A | 9/2015 |
| CN | 105026815 A | 11/2015 |
| CN | 106126904 A | 11/2016 |

OTHER PUBLICATIONS

U.S. Appl. No. 15/818,562, filed Nov. 20, 2017, all pages.
International Search Report and Written Opinion dated May 16, 2019 in PCT/US2019/017582, all pages.

* cited by examiner

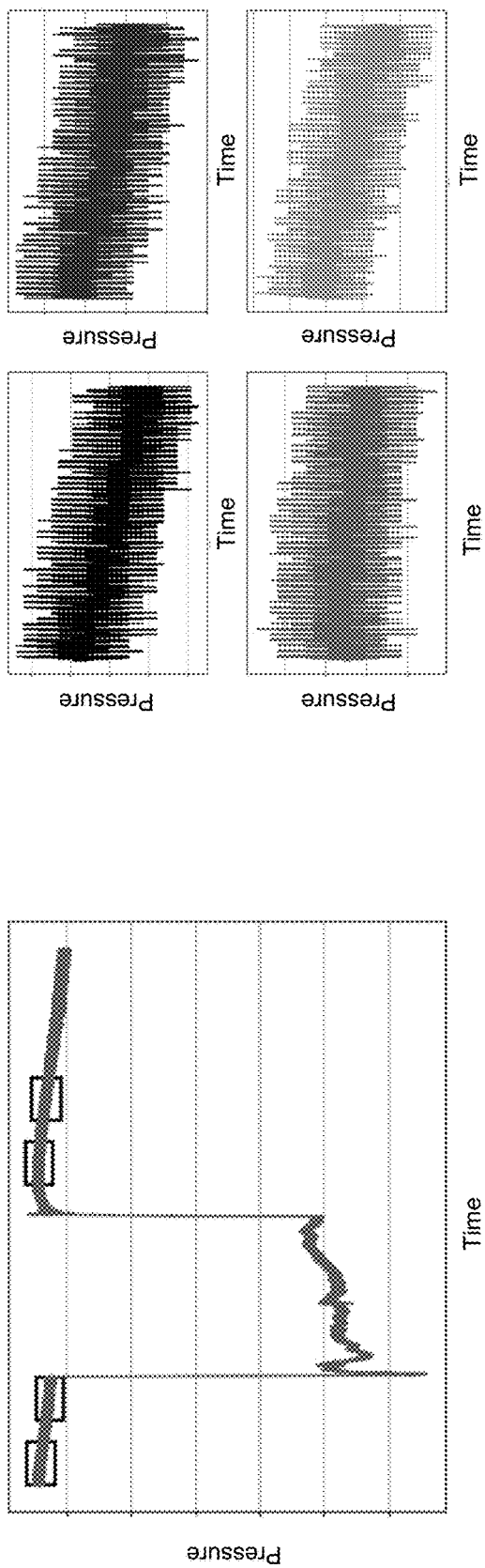
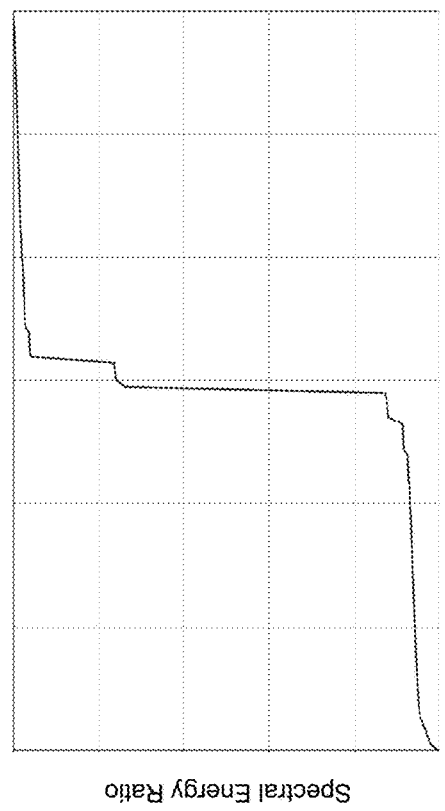
FIG. 8A
FIG. 8B
FIG. 8C

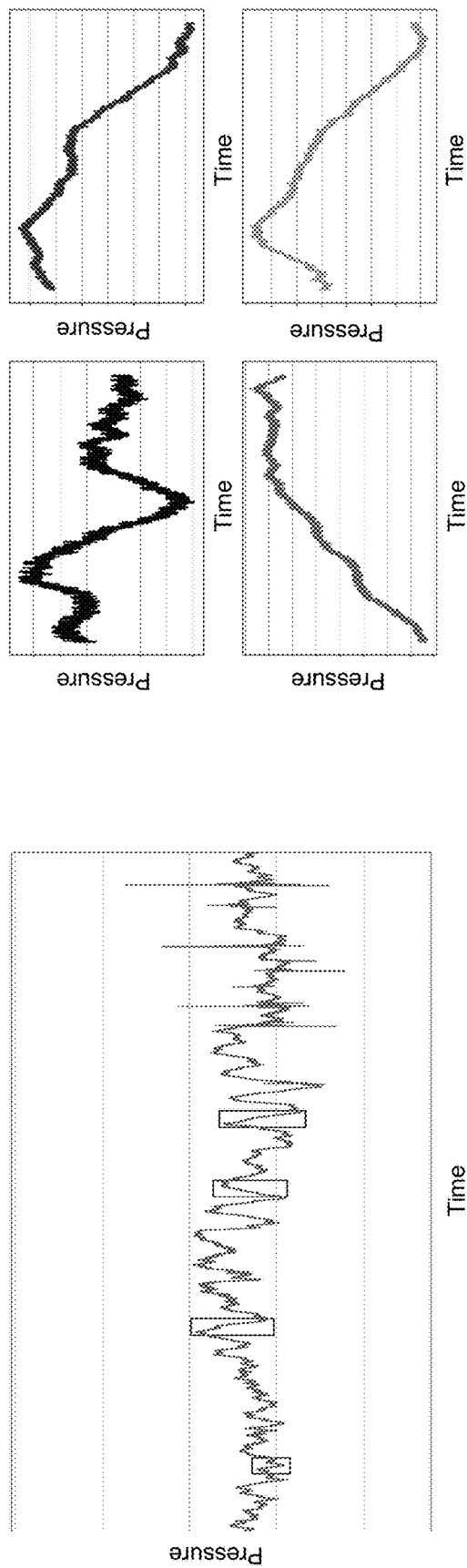
FIG. 9A
FIG. 9B
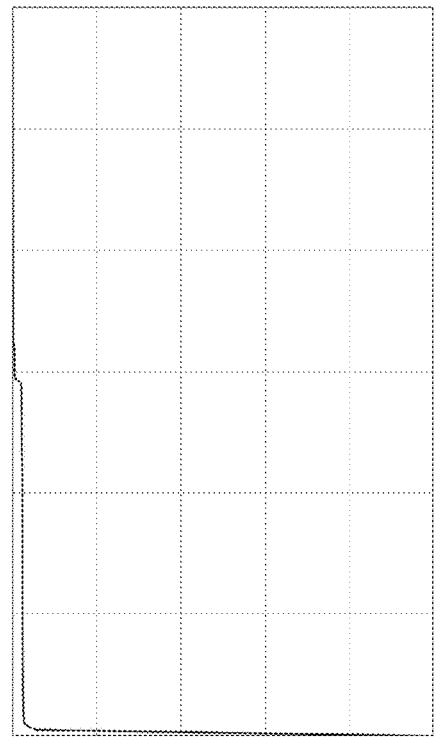
FIG. 9C

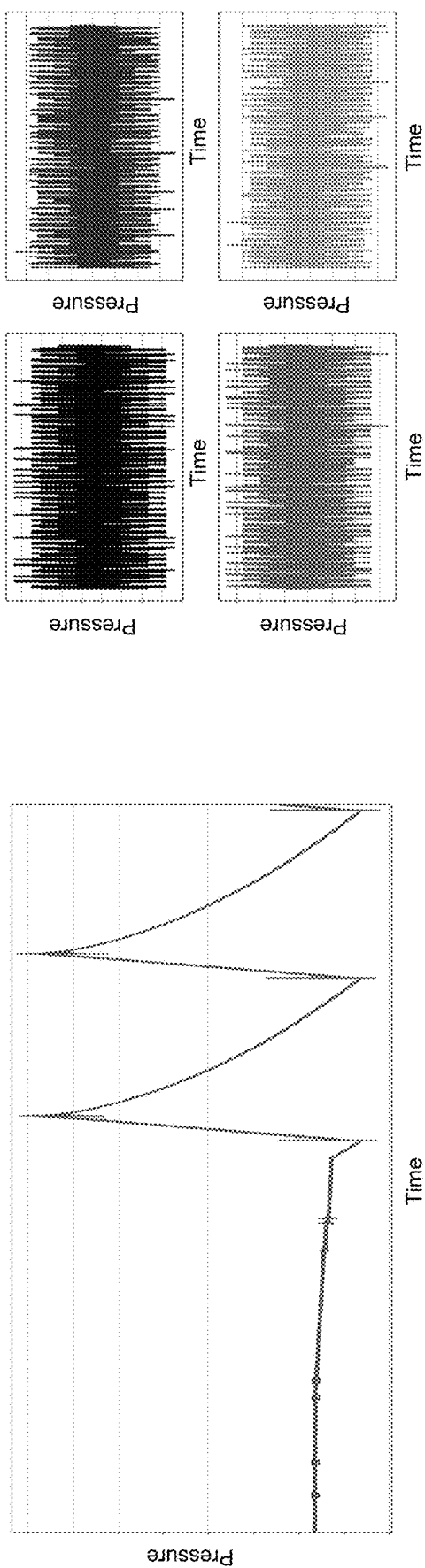
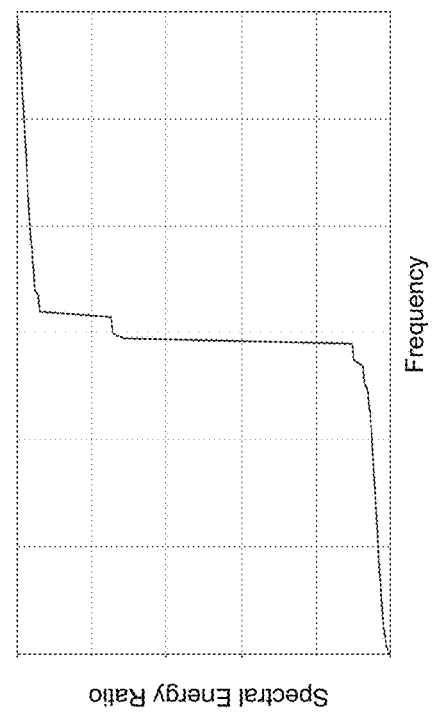
FIG. 10A
FIG. 10B
FIG. 10C

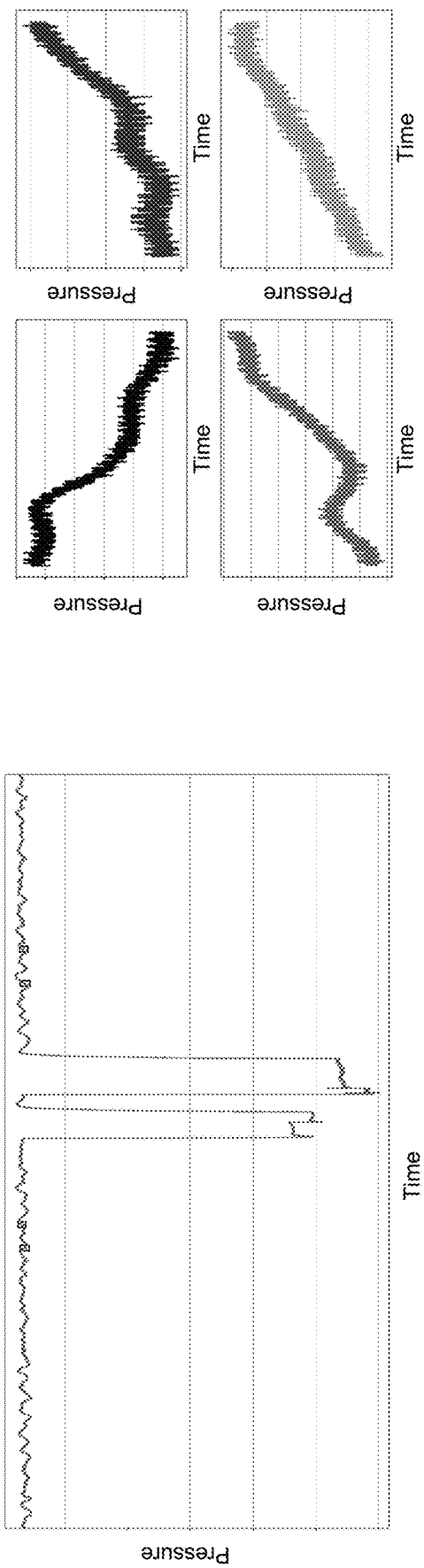
FIG. 11B
FIG. 11A
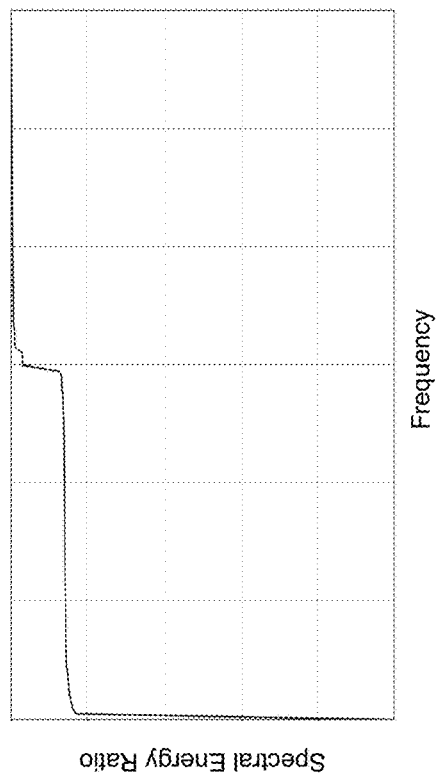
FIG. 11C

BUILDING TYPE CLASSIFICATION

CROSS-REFERENCE TO RELATED APPLICATION

This application claims priority under 35 U.S.C. § 119 to U.S. Provisional Patent Application No. 62/631,085, filed on Feb. 15, 2018, the contents of which are hereby incorporated by reference in their entirety for all purposes.

BACKGROUND

This disclosure relates in general to systems and methods for determining the type of plumbing system within a building. It may be helpful for a plumber or a home inspector to know whether a building has a working pressure reducing valve (PRV), a non-functional PRV, no PRV, a check valve, and/or a well. It would be advantageous to provide a quick and non-invasive method of performing such a determination.

SUMMARY

Exemplary embodiments of the invention provide systems and methods for determining the type of plumbing system within a building. According to an aspect of the invention, a method includes determining a spectral energy ratio as a function of first pressure data acquired during a first time period in which a water flow through a plumbing system of a building is below a flow threshold, determining a multimodal test value as a function of second pressure data acquired during a second time period that includes at least some time during which the water flow through the plumbing system is greater than or equal to the flow threshold, and identifying a type of the plumbing system of the building as a function of the spectral energy ratio and the multimodal test value. The type of the plumbing system of the building may be identified as a system that includes a working PRV, a non-functional PRV, no PRV, a well, and/or a check valve.

The method may also include analyzing a slope of the second pressure data, determining a skewness of the second pressure data, and determining a median divergence of the second pressure data. The type of the plumbing system may be identified as a function of the spectral energy ratio, the multimodal test value, the slope, the skewness, and the median divergence.

The spectral energy ratio may be determined as a numerator divided by a denominator, the numerator is a portion of energy of the first pressure data within a first frequency band from 0 Hz to a target frequency, and the denominator is a total energy of the first pressure data. The multimodal test value may be determined as a function of a difference between two peaks of a histogram of the second pressure data and a minimum between the two peaks. The first time period may at least partially overlap with the second time period.

If the spectral energy ratio is above a first threshold, the type of plumbing system may be identified as a system that includes a well or a working PRV. On the other hand, if the spectral energy ratio is equal to or below the first threshold, the type of plumbing system may be identified as a system that includes a non-functional PRV or no PRV.

According to another aspect of the invention, a method includes determining a spectral energy ratio as a function of first pressure data acquired during a first time period in which a water flow through a plumbing system of a building is below a flow threshold, determining at least one metric as a function of second pressure data acquired during a second time period that includes at least some time during which the water flow through the plumbing system is greater than or equal to the flow threshold, and identifying a type of the plumbing system of the building as a function of the spectral energy ratio and the at least one metric. The type of the plumbing system of the building may be identified as a system that includes a working PRV, a non-functional PRV, no PRV, a well, or a check valve.

The at least one metric may include a check valve metric that is a function of the second pressure data, a variation in turbulence of the second pressure data, a number of slow slope drops in the second pressure data, a number of fast slope drops in the second pressure data, a noise level of the second pressure data, and/or a number of high pressure drops in the second pressure data.

The spectral energy ratio may be determined as a numerator divided by a denominator, the numerator is a portion of energy of the first pressure data within a first frequency band from 0 Hz to a target frequency, and the denominator is a total energy of the first pressure data. The first time period may at least partially overlap with the second time period.

If the spectral energy ratio is above a first threshold, the type of plumbing system may be identified as a system that includes a check valve, a well, and/or a working PRV. On the other hand, if the spectral energy ratio is equal to or below the first threshold, the type of plumbing system may be identified as a system that includes a non-functional PRV or no PRV.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 8A-8C depict an example of calculating the spectral energy ratio for a building with a working PRV;

FIGS. 9A-9C depict an example of calculating the spectral energy ratio for a building without a PRV;

FIGS. 10A-10C depict an example of calculating the spectral energy ratio for a building with a well;

FIGS. 11A-11C depict an example of calculating the spectral energy ratio for a building with a non-functional PRV;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Exemplary embodiments of the invention classify the type of plumbing system in a house or another building by analyzing the pressure within the plumbing system. As described in further detail below, it may be determined whether the plumbing system has a working PRV, a non-functional PRV, no PRV, a check valve, and/or a well. This determination is based on analyzing the pressure as a function of time while the water is turned on and/or while the water is turned off.

The pressure within the plumbing system can be analyzed with a water device, such as the water device described in application Ser. No. 15/344,458, entitled "SYSTEM AND METHOD FOR LEAK CHARACTERIZATION AFTER SHUTOFF OF PRESSURIZATION SOURCE," filed on Nov. 4, 2016, which is incorporated by reference for all purposes. A municipal water system is pressurized so that the plumbing fixtures dispense water when opened. The water main into the building is typically at 80-120 psi. Most buildings buffer the water main pressure with a PRV to lower the pressure to 40-70 psi, which also isolates noise seen with sensors when connected directly to the water main. Within the building, temperature and pressure will stabilize at a given rate of flow caused by leak or other egress from the plumbing system even for situations with the flow sensor cannot perceive anything. As discussed in further detail below, the water device may also be used to detect leaks within the plumbing system and monitor various other characteristics of the plumbing system.

Figure 1:
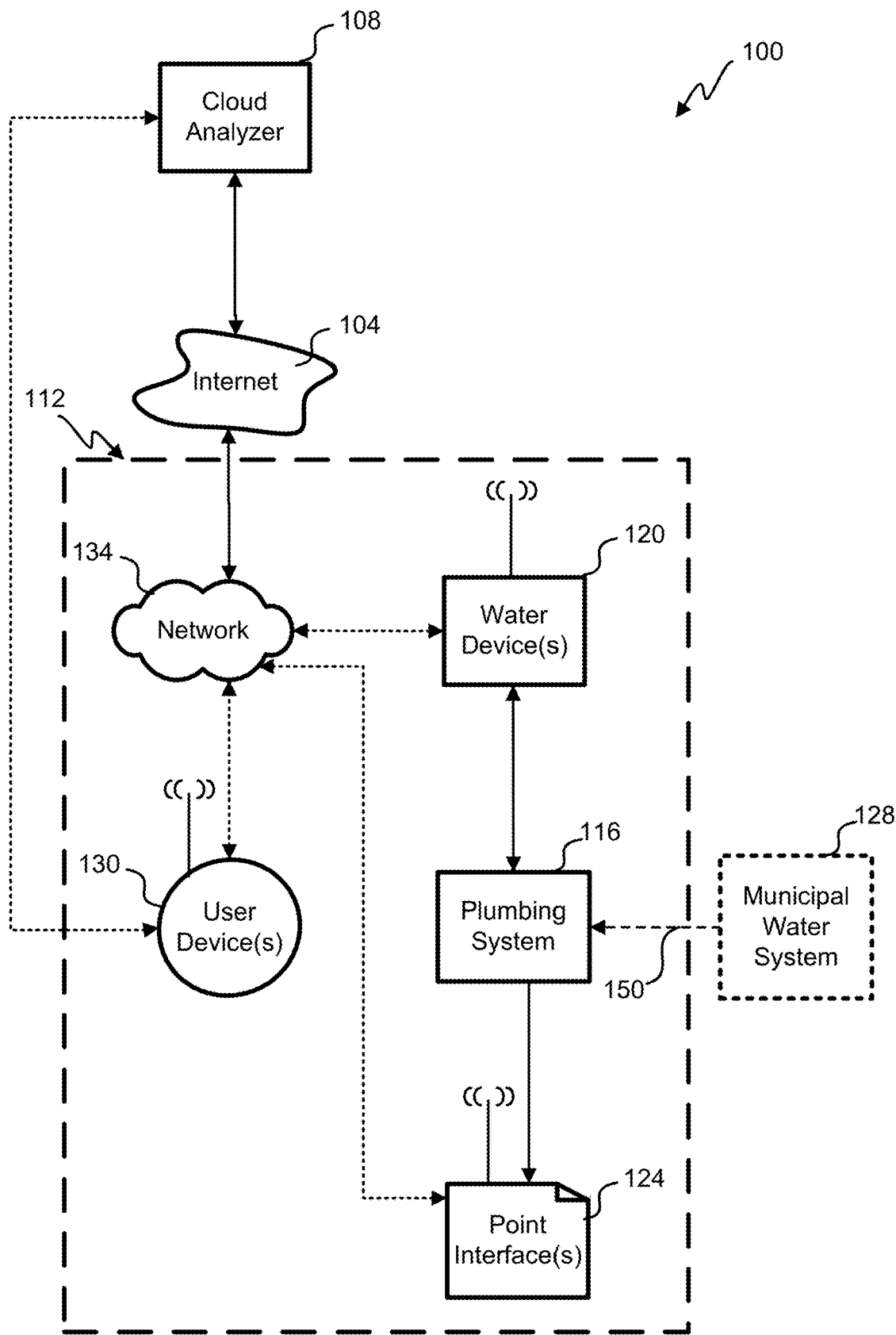
FIG. 1 depicts a block diagram of an embodiment of a water analysis system.

Referring first to FIG. 1, a block diagram of an embodiment of a water analysis system 100 is shown. The municipal water system 128 is connected to the building 112 with a water main 150, but other embodiments could source their water from a well, a cistern, a tank, or any other source. Different water sources may use different flow and leak detection algorithms.

Remote from the building 112 over the Internet 104 is a cloud analyzer 108 that is in communication with various buildings and user devices 130. User account information, sensor data, local analysis, municipal water usage information for the building 112 is passed to the cloud analyzer 108. User devices 130 may connect with the water device 120 and the cloud analyzer 108 through a local network 134 and/or a cellular network. The water device 120 can have an Ethernet, a broadband over power line, a WiFi, and/or a cellular connection coupled to the cloud analyzer 108. Some embodiments include a gateway or peer node that the water device can connect to that is coupled to the network 134 and/or Internet 104 using WiFi, Bluetooth, Zigbee, or other short range wireless signals. Generally, there is a gateway or firewall between the network 134 and the Internet 104.

Within the building 112, the plumbing system 116 is a collection of pipes connected to appliances and fixtures all coupled to the water main 150. A building may have one or more water device(s) 120 in fluid communication with the plumbing system 116. A water device 120 may be coupled to the cold and/or hot water pipe at a particular location, or coupled to any accessible faucet or other source of water, and wirelessly or wire communicates with the network 134.

One or more point interface(s) 124 may or may not be in fluid communication with the plumbing system, but can gather data in some embodiments such as ambient temperature, temperature outside the pipe, and/or acoustic waves inside or outside the pipe. The point interfaces 124 are coupled to the network 134 to allow input and output to the user with an interface. The point interface may be separate from the plumbing system 116 altogether while providing status on the water analysis system 100 such as instantaneous water usage, water usage over a time period, water temperature, water pressure, etc. Error conditions such as leaks, running toilets or faucets, missing or defective PRV, water bill estimates, low pressure, water heater malfunction, well pump issues, and/or other issues with the plumbing system 116 can be displayed at the point interfaces 124.

The user device 130 can be any tablet, cellular telephone, web browser, or other interface to the water analysis system 100. The water device 120 is enrolled into a user account with the user device 130. All the information available at a point interface 124 can be made available to the user device using an application, app and/or browser interface. The user device 130 can wired or wirelessly connect with the water device(s) 120, cloud analyzer 108, and/or point interface(s) 124.

Figure 2:
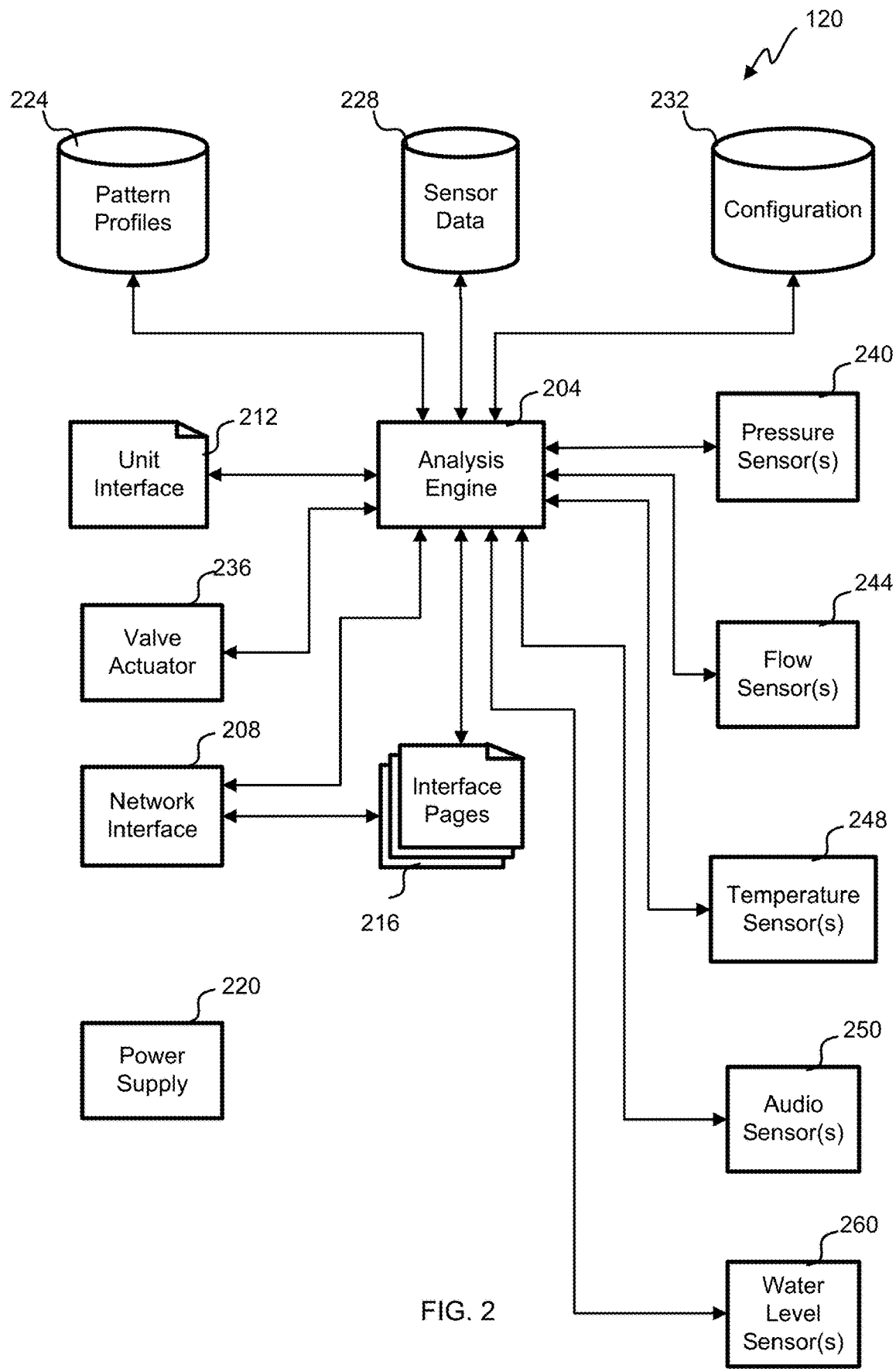
FIG. 2 depicts a block diagram of an embodiment of a water device.

With reference to FIG. 2, a block diagram of an embodiment of a water device 120 is shown. A power supply 220 could be internal or external to the water device 120 to provide DC power to the various circuits. In some embodiments, a replaceable battery provides power while other embodiments use the water pressure to drive a turbine that recharges a battery to provide power.

An analysis engine 204 gathers various data from the pressure sensor(s) 240, flow sensor(s) 244, temperature sensor(s) 248, and optionally audio sensor(s) 250 and/or water level sensor(s) 260. Interface pages 216 allow interaction with the water device 120 through a network interface 208 in a wired or wireless fashion. The analysis engine 204 also supports a unit interface 212 that is physically part of the water device 120 to display various status, information and graphics using an OLED, LED, LCD display and/or status lights or LEDs.

Various information is stored by the water device 120, which may be reconciled with the cloud analyzer 108 in-whole or in-part using the network interface 208. Sensor data for the various sensors 240, 244, 248, 250 are stored in the sensor data store 228 over time to allow for longitudinal analysis. For example, several hours through several days of sensor data can be stored. The granularity of readings and length of time stored may be predefined, limited by available storage or change based upon conditions of the plumbing system 116. For example, data samples every second over a two day period could be stored, but when a leak is suspected the sample rate could increase to 60 times a second for 4 hours of time.

When fixtures or appliances interact with the water in the plumbing system 116, repeating patterns occur at the water device 120. Pattern profiles 224 are stored to quickly match current sensor readings to known events. For example, a particular faucet when used may cause the flow, pressure and/or temperature sensor 244, 240, 248 readings to fluctuate in a predictable manner such that the pattern profile can be matched to current readings to conclude usage is occurring. Application Ser. No. 14/937,831, entitled "WATER LEAK DETECTION USING PRESSURE SENSING," filed on Nov. 10, 2015, describes this analysis and is incorporated by reference for all purposes. The pattern profiles 224 can be in the time domain and/or frequency domain to support various condition matching by the analysis engine 204. Both intentional egress and leaks have pattern profiles 224 that are stored.

A configuration database 232 stores information gathered for the water device 120. The Table depicts water supply parameters stored in the configuration database 232. Type of plumbing system 116 includes those without a PRV, well water, working PRV, and non-functional PRV. The water supply to the water main 150 can be from the municipal water system 128, a well, a water tank, or other source. The configuration database 232 can be automatically populated using algorithms of the analysis engine 204 or manually entered by the user device 130. Different fixtures and appliances connected to the plumbing system 116 are noted in the configuration database 232.

TABLE

| Water Supply | |
|---|---|
| Field | Options |
| Type | No PRV |
|  | Well water |
|  | Working PRV |
|  | Non-Functional PRV |
| Supply | Municipal water |
|  | Well |
|  | Tank |

Figure 3:
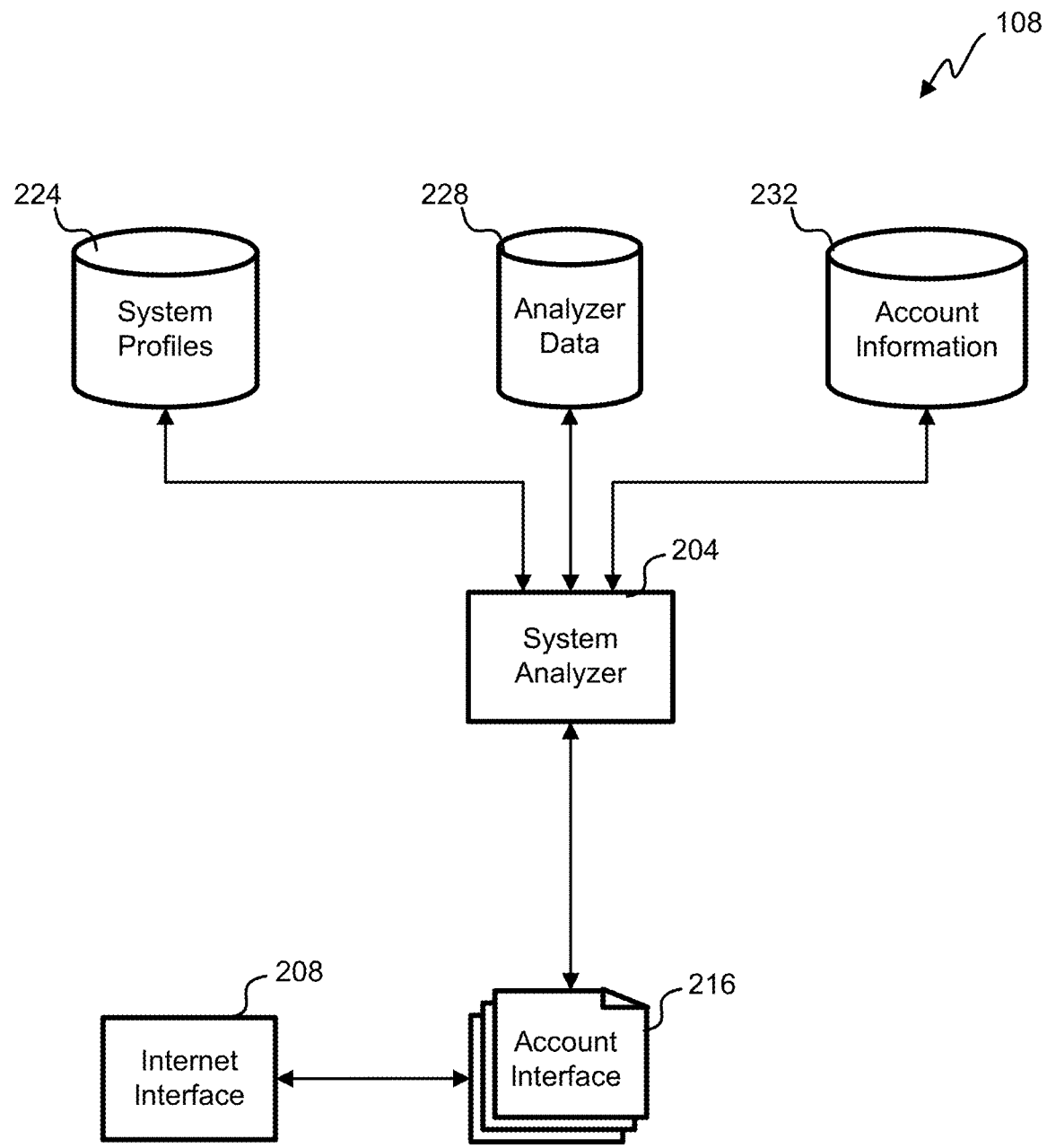
FIG. 3 depicts a block diagram of an embodiment of a cloud analyzer.

Referring next to FIG. 3, a block diagram of an embodiment of a cloud analyzer 108 is shown. The cloud analyzer 108 receives data and configuration information from many buildings 112 throughout the water analysis system 100. Each building 112 has a system profile 224 that is stored including the fixtures, appliances, water device(s) 120, point interface(s) 124, type of water supply, water source type are stored. Account information 232 including login credentials, building location, and user demographic information is also stored. Gathered sensor data in raw and processed form is stored as analyzer data 228 and could include usage history, specific egress events, leaks detected, etc.

The system analyzer 204 can process the data from each building 112 to find patterns corresponding to leaks, malfunctions, and other events that are not recognized by the water device 120 locally. The system analyzer 204 can access any water device 120 or point interface 124 to test functionality, update software, and gather data. Where a user device 130 is coupled to the cloud analyzer 108, the system analyzer 204 receives commands to perform requested tasks.

For example, the user device 130 can query for usage on a per fixture or appliance basis. Overall usage can also be determined. The system analyzer 204 can access the water utility usage and billing to provide insights into costs and overall consumption. For those utilities that provide usage information in real time, the usage and cost can be determined for each use of the plumbing system 116.

An account interface 216 allows various water devices 120 and user devices 130 to interact with the cloud analyzer 108 through an internet interface 208. The cloud analyzer 108 provides historical and real time analysis of buildings 118 a user is authorized to access. Various interaction pages allow entry of plumbing system information, configuration parameters, building location and user demographic information. Various reports and status parameters are presented to the user device through the account interface 216.

Figure 4:
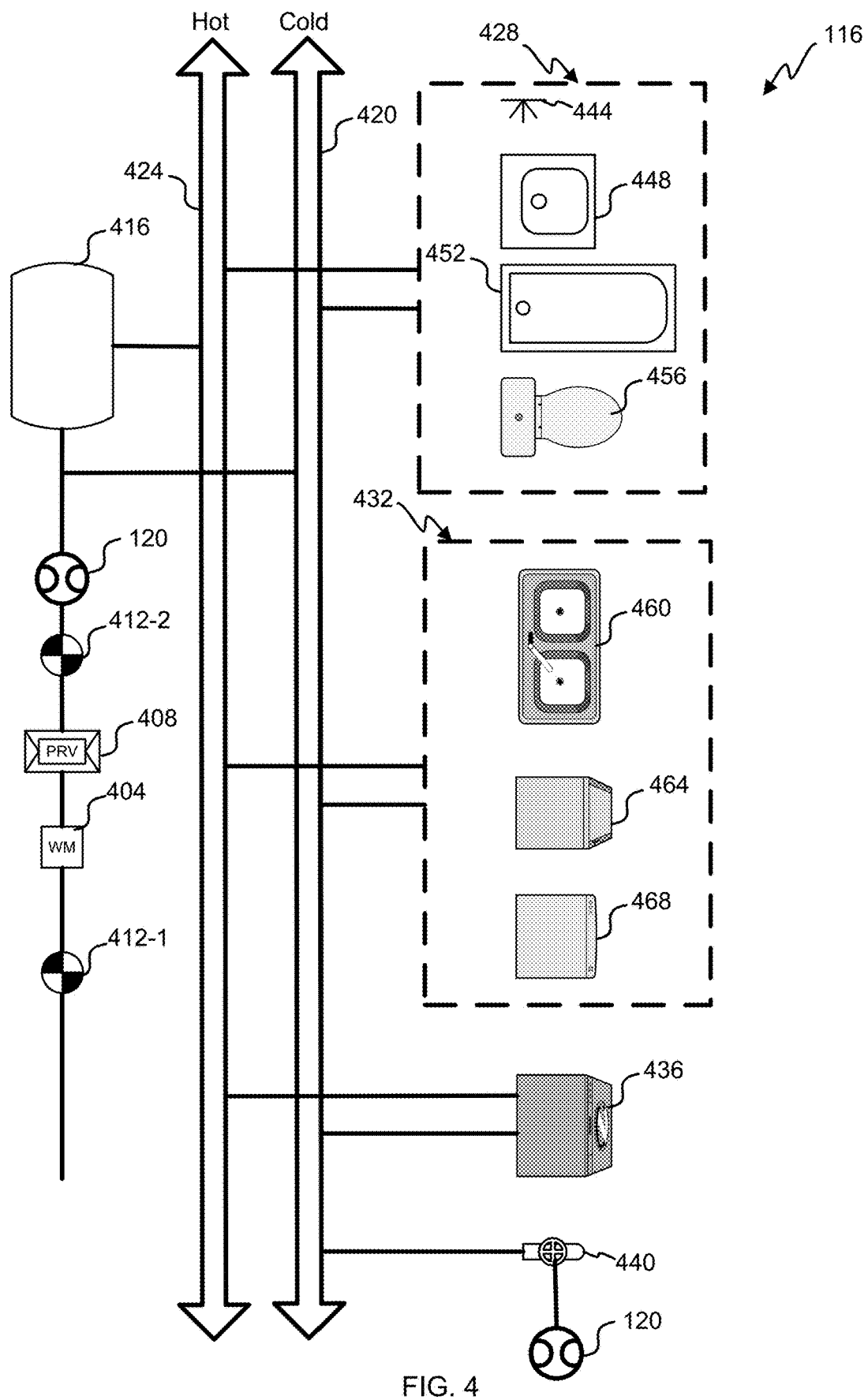
FIG. 4 depicts a block diagram of an embodiment of a plumbing system.

With reference to FIG. 4, a block diagram of an embodiment of a plumbing system 116 is shown. The municipal water system 128 is connected to a main shutoff valve 412-1 before the water main passes through a water meter 404 provided by the municipality for billing purposes. The water meter 404 may be electronically or manually read to determine the bill, but some embodiments allow real time reading of the water meter 404 electronically.

Building codes often require use of a PRV 408, but not universally. Older homes may also be missing a PRV, have one that no longer functions properly or have less than 80 psi supplied by the municipal water system 128. A building shutoff valve 412-2 is often located interior to the building 112 and provides another place to close off the water main. A water device 120 is located after the building shutoff valve 412-2, but before a water heater 416 in this embodiment. The water device 120 can be placed under the sink, near an appliance or any other location where fluid coupling is convenient along with a source of power is nearby. In this example, a portion of a water line may be removed, such that the water device 120 may be installed within the water line. Alternatively, as discussed in further detail below, the water device 120 can be coupled to a faucet through which water can flow, such as a water spigot 440. The hot water pipes 424 provide heated water to the building 118 and the cold water pipes 420 provide unheated water varying between the ambient temperature in the building 112 and the temperature of the municipal water system 128.

This embodiment has a single bathroom 428, a kitchen 432, a washing machine 436, and a water spigot 440, but other embodiments could have more or less fixtures and appliances. The bathroom 428 has a shower 444, sink 448, bathtub 452, and toilet 456 that use water. The sink 448, bathtub 452, and shower 444 are all hooked to both the hot and cold water pipes 424, 420. The toilet 456 only requires cold water so is not hooked to the hot water supply.

The kitchen 432 includes a two-basin sink 460, a refrigerator 464 with a liquid/ice dispenser, and a dishwasher 468. The refrigerator 464 only receives cold water 420, but the two-basin sink 460 and dishwasher 468 receive both cold and hot water 420, 424. Kitchens 432 commonly include single-basin sinks and other appliances that might be coupled to the water.

Figure 5:
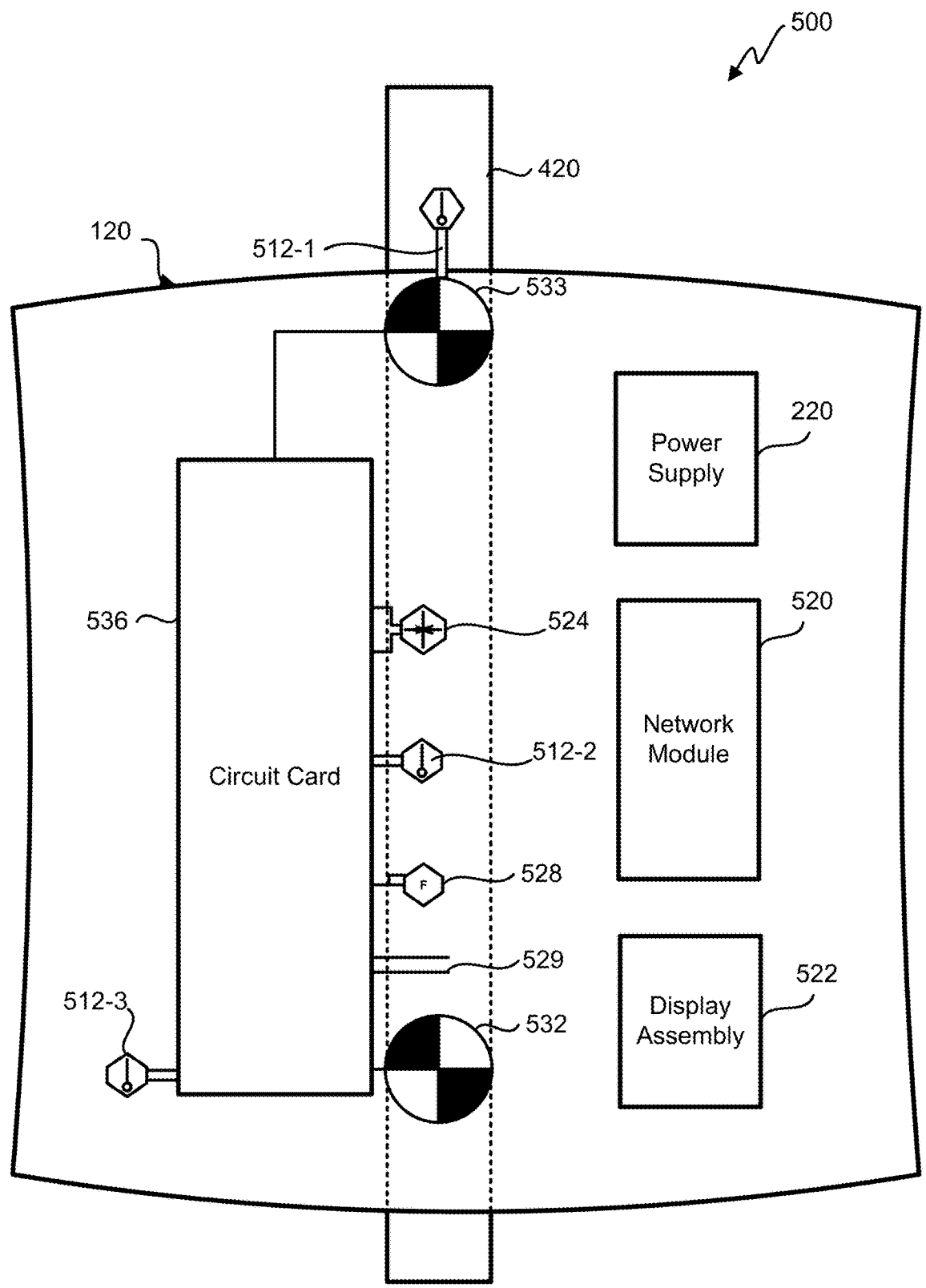
FIG. 5 depicts a diagram of an embodiment of an installed water device.

Referring next to FIG. 5, a diagram of an embodiment of a water device 500 is shown. The water device 120 may pass water through a pipe 420 that is integral to the water device 120. The pipe 420 may be attached on both ends to either a hot or a cold water line. Alternatively, the top of the pipe 420 may be connected to an adapter for a faucet, as described in Applications Ser. No. 62/611,187, entitled "PORTABLE DEVICE FOR WATER ANALYSIS," filed on Dec. 28, 2017, which is incorporated by reference for all purposes. The integral portion of the pipe 420 could be made of copper, PVC, plastic, or other building pipe material and could be mated to the plumbing system 116 with soldered joints, glued joints, and/or detachable and flexible hoses.

There are several modules that make up the water device 120. The power supply 220 powers the water device 120 and could be internal or external to the enclosure. A network module 520 includes the network interface 208 to allow wired or wireless communication with the network 134 and Internet 104 to other components of the water analysis system 100. A display assembly 522 includes the unit interface 212.

Another module is the circuit card 536 which performs the processing for various sensors. Sensor information can be processed on the circuit card using the analysis engine 204 and/or processed in the cloud using the system analyzer 204. Sensor information is gathered and analyzed over hours and days to find weak signals in the data indicating usage, leaks and other issues. The circuit card 536 might recognize sensor samples of interest and upload those to the cloud analyzer 108 for deeper learning. The circuit card and cloud analyzer can use artificial intelligence, genetic algorithms, fuzzy logic, and machine learning to recognize the condition and state of the plumbing system 116.

This embodiment includes three temperature sensors 512 to measure the ambient temperature with a sensor near the outside of the enclosure and away from the internal electronics and water temperature of the water in the pipe 420 in two locations. A first temperature sensor 512-1 measures water temperature in contact with the water as it enters the pipe 420 of the water device 120 away from any heat that the various circuits might generate. A second temperature sensor 512-2 measures water temperature at a second location within the pipe 420 and away from the first temperature sensor 512-1. Based upon readings of the two water temperature sensors 512-1, 512-2, the heat generated by the water device 120 can be algorithmically corrected for. Some embodiments may only use a single water temperature sensor and/or forgo the ambient temperature sensing. Ambient temperature may be measured by other equipment in the building and made available over the network 134, for example, the thermostat, smoke detectors, point interface(s) 124 can measure ambient temperature and provide it to other equipment in the building 112. A third temperature sensor 512-3 measures the ambient temperature outside of the pipe 420.

This embodiment includes an electronically actuated shutoff valve 532. The shutoff valve 532 can be used to prevent flooding for leaks downstream of the water device 120. Additionally, the shutoff valve 532 can aid in detecting leaks. Closing the shutoff valve 532 and detecting a falling pressure is indicative of a leak downstream. Some embodiments can partially close the shutoff valve 532 to regulate pressure downstream. A one-way valve 533 may also be provided to regulate water flow into the pipe 420.

A flow sensor 528 is used to measure the flow in the pipe 420. In this embodiment, an ultrasonic flow sensor is used, but other embodiments could use a rotameter, variable area flow meter, spring and piston flow meter, mass gas flow meters, turbine flow meters, paddlewheel sensors, positive displacement flow meter, and vortex meter. Generally, these meters and sensors cannot measure very small flows in a pipe in a practical way for building deployments. A plurality of electrodes 529 including a reference electrode and a measurement electrode may be provided within the pipe 420 to indicate a water level within the pipe 420.

The circuit card 536 is coupled to a pressure sensor 524 coupled to the water in the pipe 420. Readings from the pressure sensor are used to test the PRV, well pump, water supply, and pipe for leaks as well as identify normal egress from the water fixtures and appliances. Pressure and temperature vary with flow such that the pressure sensor 524 and temperature sensor 512-1, 512-2 can be used to detect flow as small as tiny leaks under certain circumstances. The circuit card 536 observes trends in the sensor data, performs spectral analysis, pattern matching and other signal processing on the sensor data. Application Ser. No. 15/818,562, entitled "PASSIVE LEAK DETECTION FOR BUILDING WATER SUPPLY," filed on Nov. 20, 2017, describes how to use the water device 500 to detect and characterize small leaks, and is incorporated by reference for all purposes.

Figure 6A:
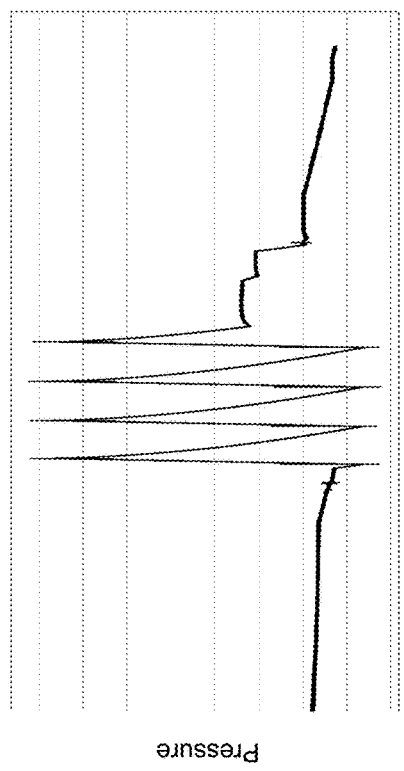
FIGS. 6A-6E depict graphs of pressure data as a function of time for various building types.
Figure 6C:
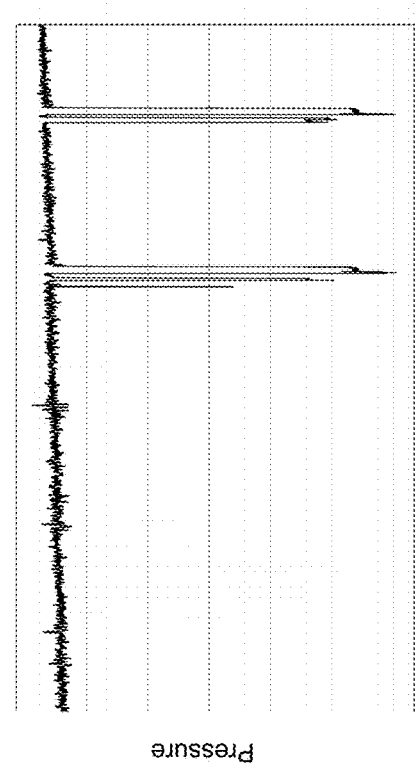
Figure 6B:
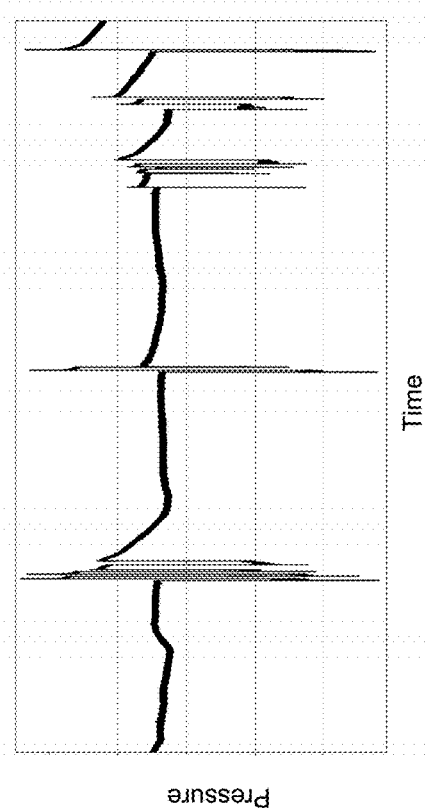
Figure 6D:
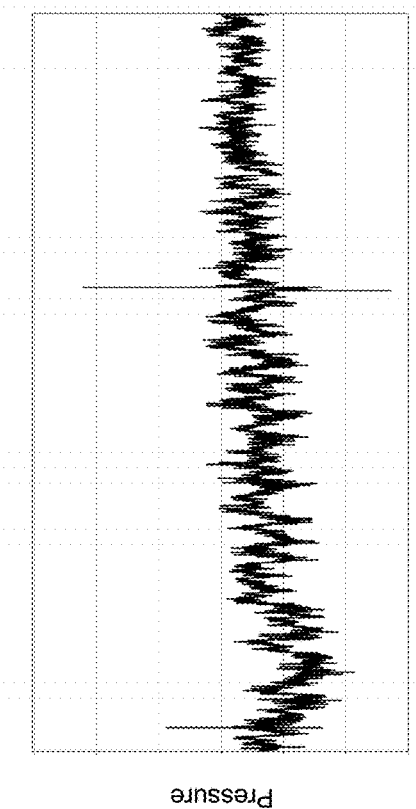
Figure 6E:
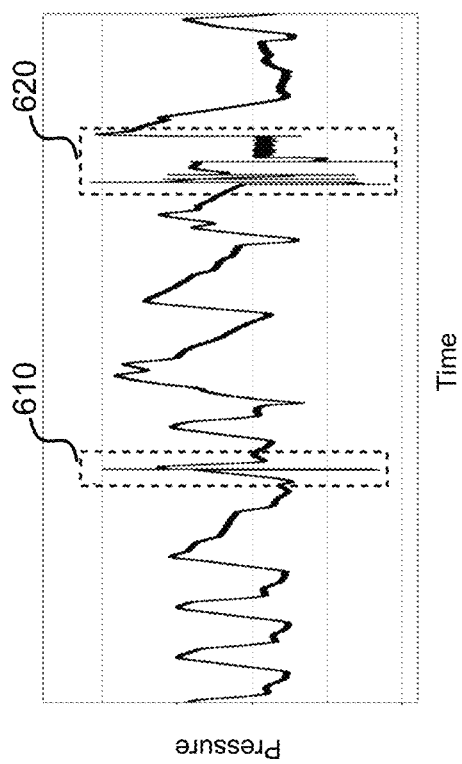

Referring next to FIGS. 6A-6E, graphs of pressure data as a function of time are shown for various building types. For example, the building may be a home or any other type of building with a plumbing system. Specifically, FIG. 6A shows pressure data for a building having a working PRV; FIG. 6B shows pressure data for a building having no PRV; FIG. 6C shows pressure data for a building having a well; FIG. 6D shows pressure data for a building having a non-functional PRV; and FIG. 6E shows pressure data for a building having a check valve. Due to the distinctive features present in each of the graphs, measurements of pressure data may be analyzed to determine whether a home or any other type of building with a plumbing system has a working PRV, no PRV, a well, a check value, and/or a non-functional PRV. Areas 610 and 620 shown in FIG. 6E are examples of non-silent periods, which will be discussed in further detail below.

Figure 7:
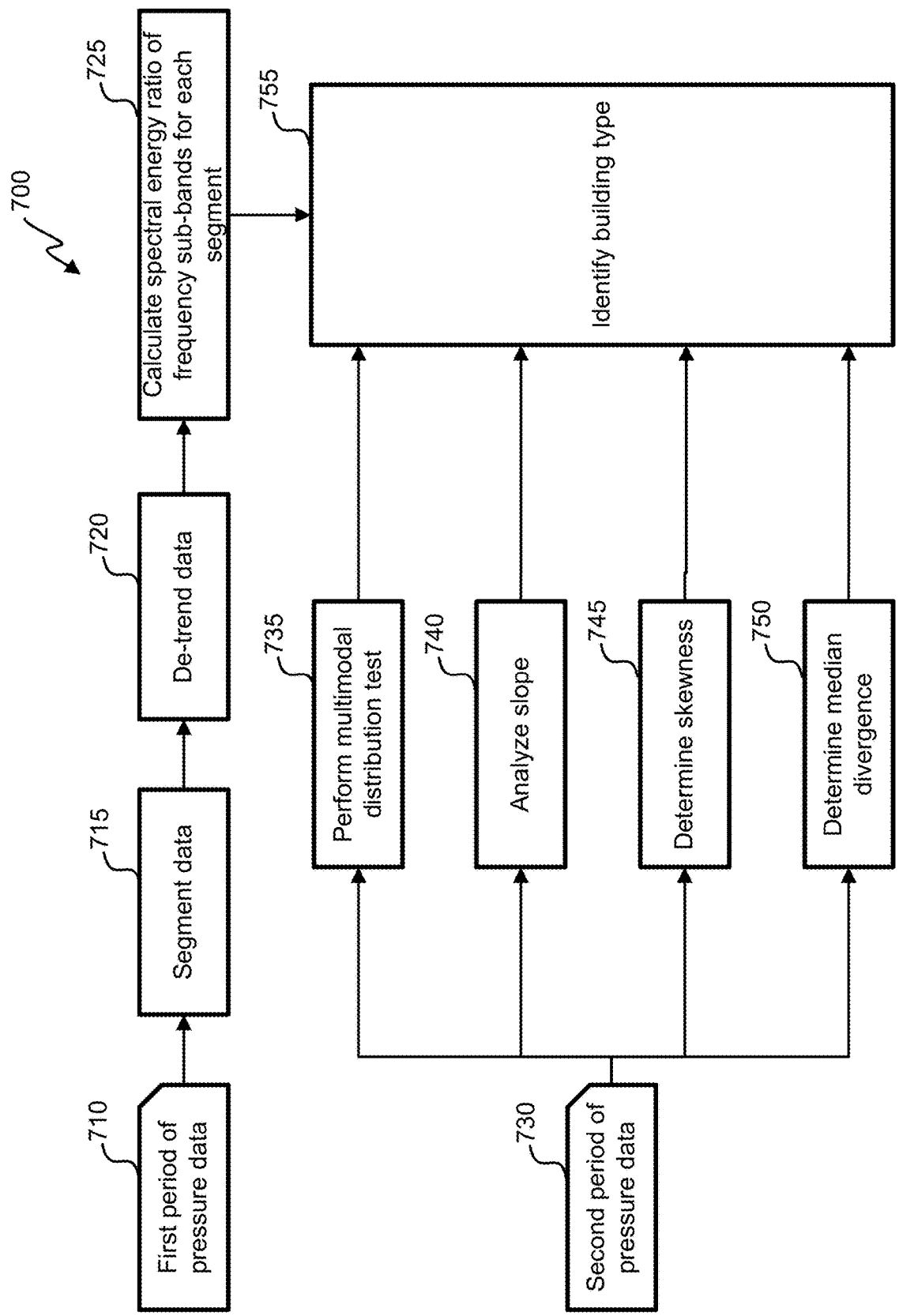
FIG. 7 depicts a flowchart of a method for determining a building type.

Referring next to FIG. 7, a flowchart 700 of a method for determining a building type is shown. As shown in FIG. 7, a first period of pressure data 710 is segmented at block 715 to extract segments without any intentional water activity, also known as silent periods. These segments may be times when the water flow is below a flow threshold. The flow threshold may be a level at which there is no perceptible flow of water through the plumbing system. The segmenting may be performed based on known times when a faucet was turned on or off, such that only times during which water was not intentionally made to flow through the plumbing system are included in the silent period segments. The data within the silent period segments may then be de-trended at block 720. The de-trending may remove noise components within the pressure data 710, such as noise from pressure expansion due to temperature. Any suitable de-trending method may be used. Further, any suitable number of silent period segments may be defined. For example, the analysis may be expedited by extracting and de-trending a single silent period segment. The first period of pressure data 710 may include pressure data from any suitable temporal duration, such as 24 hours.

A spectral energy ratio is then calculated for each of the silent period segments at block 725. The spectral energy ratio is defined by the following:

$$\text{Spectral\_Energy\_Ratio} = \frac{\text{Energy of segment in frequency band}}{\text{Total energy of segment}} \quad (1)$$

The frequency band may range from 0 Hz to a target frequency, such as 5 Hz, 10 Hz, or 20 Hz. The target frequency may be chosen based on observations of frequencies where noise occurs within the spectrum. For example, if most of the noise occurs between 0 and 10 Hz, the target frequency may be chosen to be between 0 and 10 Hz. The spectral energy ratio may be calculated for one, some, or all of the target frequencies within the spectrum.

Referring next to FIGS. 8A-8C, an example of calculating the spectral energy ratio for a building with a working PRV is shown. Specifically, FIG. 8A shows pressure data as a function of time for a building with a working PRV, and the dashed line enclosures indicate four silent period segments that are shown in additional detail in FIG. 8B. As shown in FIGS. 8A and 8B, the silent period segments for a building with a working PRV are relatively flat. As discussed above with regard to FIG. 7, the silent period segments are extracted from the pressure data at block 715 and de-trended at block 720. The spectral energy ratio is then calculated for each of the silent period segments according to Equation (1) at block 725. FIG. 8C shows the spectral energy ratio as a function of frequency for one of the silent period segments shown in FIG. 8B. Alternatively, a single spectral energy ratio may be calculated for a specific target frequency. Further, the spectral energy ratio may be calculated for one or a plurality of the silent period segments.

Referring next to FIGS. 9A-9C, an example of calculating the spectral energy ratio for a building without a PRV is shown. Specifically, FIG. 9A shows pressure data as a function of time for a building with no PRV, and the dashed line enclosures indicate four silent period segments that are shown in additional detail in FIG. 9B. As shown in FIGS. 9A and 9B, the silent period segments for a building with no PRV may have some variation. As discussed above with regard to FIG. 7, the silent period segments are extracted from the pressure data at block 715 and de-trended at block 720. The spectral energy ratio is then calculated for each of the silent period segments according to Equation (1) at block 725. FIG. 9C shows the spectral energy ratio as a function of frequency for one of the silent period segments shown in FIG. 9B. Alternatively, a single spectral energy ratio may be calculated for a specific target frequency. Further, the spectral energy ratio may be calculated for one or a plurality of the silent period segments.

A comparison of FIGS. 8C and 9C indicates that the spectral energy ratio is low for frequencies below the municipal power-line frequency (typically approximately 60 Hz) for buildings with a working PRV, but is high starting at very low frequencies for buildings with no PRV. Accordingly, as discussed in further detail below, the spectral energy ratio at low frequencies may be used to distinguish a building having a working PRV from a building with no PRV. Any suitable threshold may be used. For example, a building with a working PRV may be identified as having an average spectral energy ratio below 50% at a target frequency of 20 Hz, and a building with no PRV may be identified as having an average spectral energy ratio above 50% at a target frequency of 20 Hz.

Referring next to FIGS. 10A-10C, an example of calculating the spectral energy ratio for a building with a well is shown. Specifically, FIG. 10A shows pressure data as a function of time for a building with a well, and the dashed line enclosures indicate four silent period segments that are shown in additional detail in FIG. 10B. As shown in FIGS. 10A and 10B, the silent period segments for a building with a well are relatively flat. As discussed above with regard to FIG. 7, the silent period segments are extracted from the pressure data at block 715 and de-trended at block 720. The spectral energy ratio is then calculated for each of the silent period segments according to Equation (1) at block 725. FIG. 10C shows the spectral energy ratio as a function of frequency for one of the silent period segments shown in FIG. 10B. Alternatively, a single spectral energy ratio may be calculated for a specific target frequency. Further, the spectral energy ratio may be calculated for one or a plurality of the silent period segments.

Referring next to FIGS. 11A-11C, an example of calculating the spectral energy ratio for a building with a non-functional PRV is shown. Specifically, FIG. 11A shows pressure data as a function of time for a building with a non-functional PRV, and the dashed line enclosures indicate four silent period segments that are shown in additional detail in FIG. 11B. As shown in FIGS. 11A and 11B, the silent period segments for a building with a non-functional PRV may have some variation. As discussed above with regard to FIG. 7, the silent period segments are extracted from the pressure data at block 715 and de-trended at block 720. The spectral energy ratio is then calculated for each of the silent period segments according to Equation (1) at block 725. FIG. 11C shows the spectral energy ratio as a function of frequency for one of the silent period segments shown in FIG. 11B. Alternatively, a single spectral energy ratio may be calculated for a specific target frequency. Further, the spectral energy ratio may be calculated for one or a plurality of the silent period segments.

A comparison of FIGS. 10C and 11C indicates that the spectral energy ratio is low for frequencies below the municipal power-line frequency (typically approximately 60 Hz) for buildings with a well, but is high starting at very low frequencies for buildings with a non-functional PRV. Accordingly, as discussed in further detail below, the spectral energy ratio at low frequencies may be used to distinguish a building with a well from a building with a non-functional PRV. Any suitable threshold may be used. For example, a building with a well may be identified as having an average spectral energy ratio less than or equal to 50% at a target frequency of 20 Hz, and a building with a non-functional PRV may be identified as having an average spectral energy ratio greater than 50% at a target frequency of 20 Hz.

Referring back to FIG. 7, a second period of pressure data 730 including pressure data as a function of time is analyzed. The second period of pressure data 730 may include time periods without any water activity (silent periods), as well as time periods with water activity (non-silent periods). For example, a non-silent period may include a duration during which a water fixture is open and water is flowing through the plumbing system, such that the water flow is greater than or equal to the flow threshold described above. The second period of pressure data 730 may be the same as the first period of pressure data 710. Alternatively, the second period of pressure data 730 may partially overlap with the first period of pressure data 710, or the second period of pressure data 730 may not overlap with any portion of the first period of pressure data 710.

As shown in FIG. 7, a multi-modal distribution test may be performed on the second period of pressure data 730 at block 735. Further, the slope of the second period of pressure data 730 may be analyzed at block 740. In addition, the skewness of the second period of pressure data 730 may be determined at block 745, and the median divergence of the second period of pressure data 730 may be determined at block 750. Results of these analyses, along with the spectral energy ratios calculated at block 725, may be utilized to determine the building type at block 755. For example, it may be determined whether a home or any other type of building with a plumbing system has a working PRV, no PRV, a well, or a non-functional PRV. Although some embodiments use information from all of the analyses shown in FIG. 7, some of the analyses and information may be omitted if they are unnecessary to determine the building type.

Figure 12B:
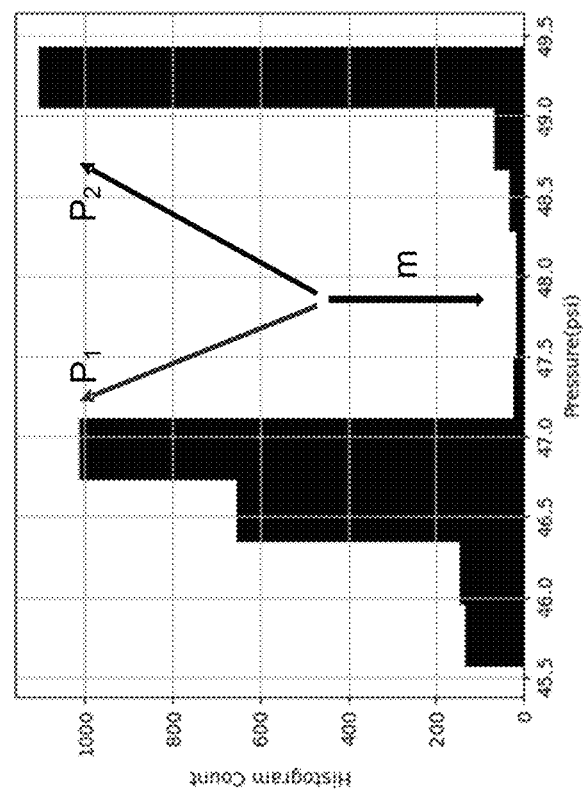
FIGS. 12A and 12B depict an example of the multimodal distribution test.
Figure 12A:
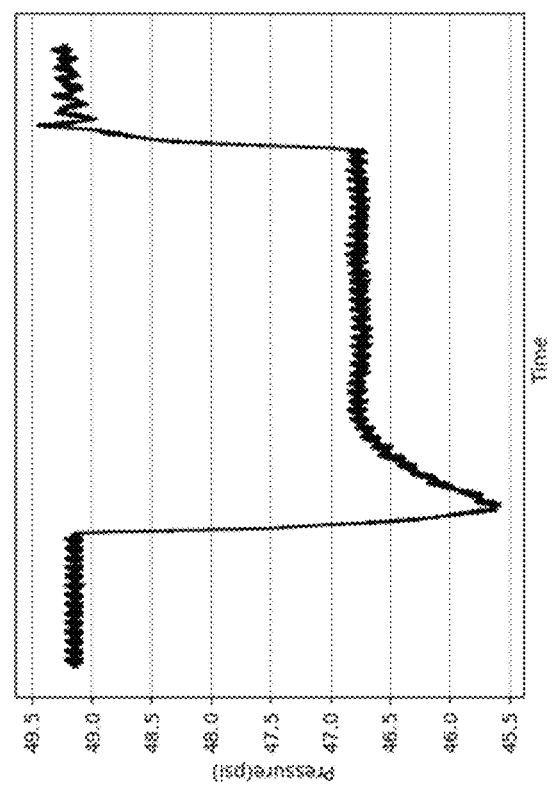

Referring next to FIGS. 12A and 12B, an example of the multimodal distribution test that may be performed at block 735 of FIG. 7 is shown. FIG. 12A shows pressure data as a function of time. The pressure data may include an event period, such as a time when water is flowing through the plumbing system. FIG. 12B shows a histogram of the pressure data shown in FIG. 12A. A multimodal test value may be defined to measure how distinguishable the different modals of the pressure data are. In other words, the multimodal test value indicates the difference between a rise and a drop in pressure during the event period. As shown in FIG. 12B, $P_1$ is the value of the first peak of the histogram, $P_2$ is the value of the second peak of the histogram, and m is the value of the minimum of the histogram between $P_1$ and $P_2$. The multimodal test value is then calculated as follows:

$$\text{Multimodal\_Test\_Value} = 1 - \frac{m}{P_1 + P_2} \quad (2)$$

As discussed in further detail below, the multimodal test value may be used to help distinguish between buildings with a non-functional PRV and buildings with no PRV. Any suitable threshold may be used. For example, a building with a non-functional PRV may be identified as having a multimodal test value greater than 90%, and a building with no PRV may be identified as having a multimodal test value less than or equal to 90%.

Figure 13:
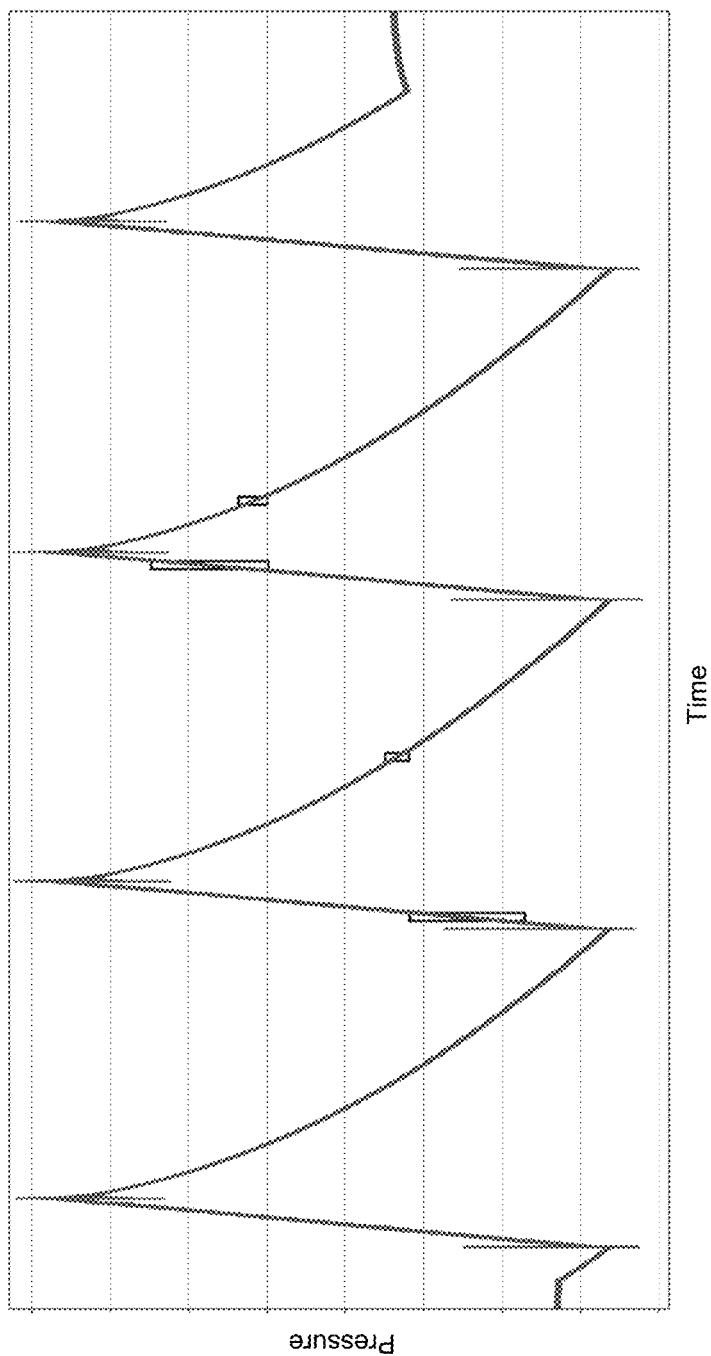
FIG. 13 depicts an example of the slope analysis.

Referring next to FIG. 13, an example of the slope analysis that may be performed at block 740 of FIG. 7 is shown. FIG. 13 shows pressure data as a function of time. The pressure data is analyzed to determine how many linear patterns having a length greater than a time period exist within the pressure data. The time period may have any suitable value, such as 20 seconds. The linear patterns may have a positive slope or a negative slope. Linear patterns meeting this criteria are indicated by the rectangles shown in FIG. 13. For example, $S_1$ is calculated as the number of linear patterns having a length greater than 20 seconds and a positive slope, while $S_2$ is calculated as the number of linear patterns having a length greater than 20 seconds and a negative slope. Pressure data having a minimum number of linear patterns with either a positive or a negative slope may indicate that the house has a well.

Figure 14B:
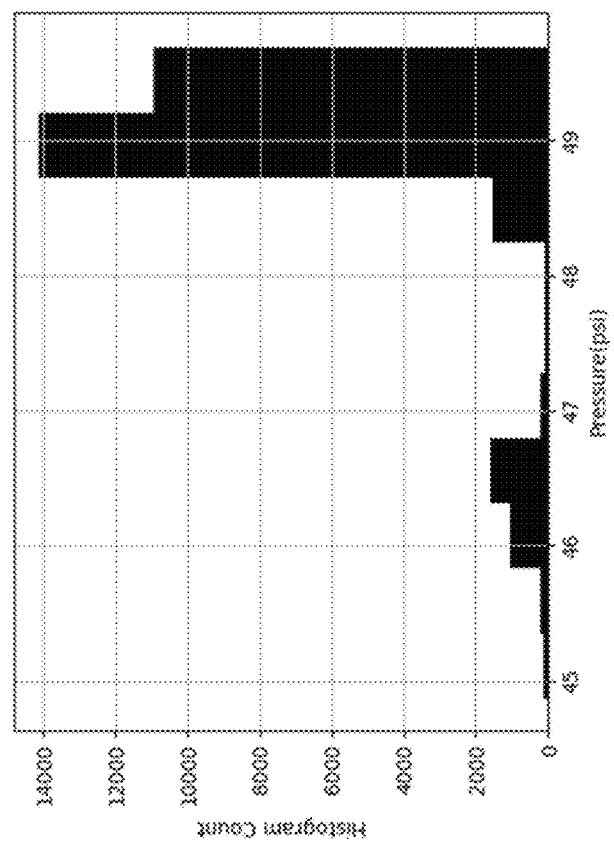
FIGS. 14A and 14B depict an example of the skewness determination.
Figure 14A:
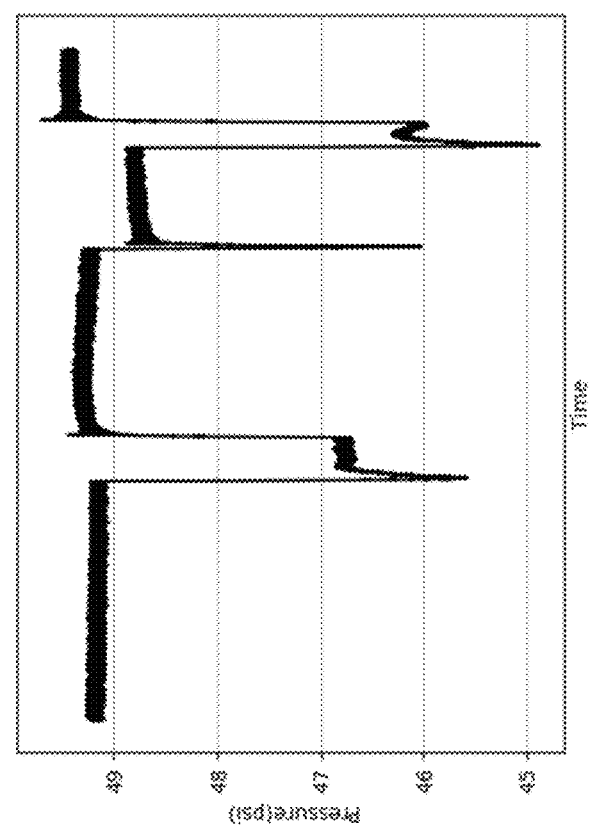

Referring next to FIGS. 14A and 14B, an example of the skewness determination that may be performed at block 745 of FIG. 7 is shown. FIG. 14A shows pressure data as a function of time. The pressure data may include an event period, such as a time when the water is flowing through the plumbing system. FIG. 14B shows a histogram of the pressure data shown in FIG. 14A. The skewness is a measure of the asymmetry of the histogram shown in FIG. 14B. The skewness may be used to help distinguish between buildings with a working PRV and buildings with a well. For example, a building with a negative skewness, such as that shown in FIG. 14B, may be identified as a building with a working PRV.

The median divergence of the pressure data may also be analyzed at block 750 of FIG. 7. The median divergence is the distance from the median of the pressure data to the maximum or the minimum of the pressure data. Specifically, a first median divergence value $M_1$ is calculated by subtracting the minimum of the pressure data from the median of the pressure data, and a second median divergence value $M_2$ is calculated by subtracting the median of the pressure data from the maximum of the pressure data.

Referring back to FIG. 7, the type of building may be identified at block 755. This identification may utilize one, some, or all of the results of the analysis performed at blocks 725, 735, 740, 745, and 750. The type of building may be identified as a building having a working PRV, a non-functional PRV, no PRV, or a well.

Figure 15:
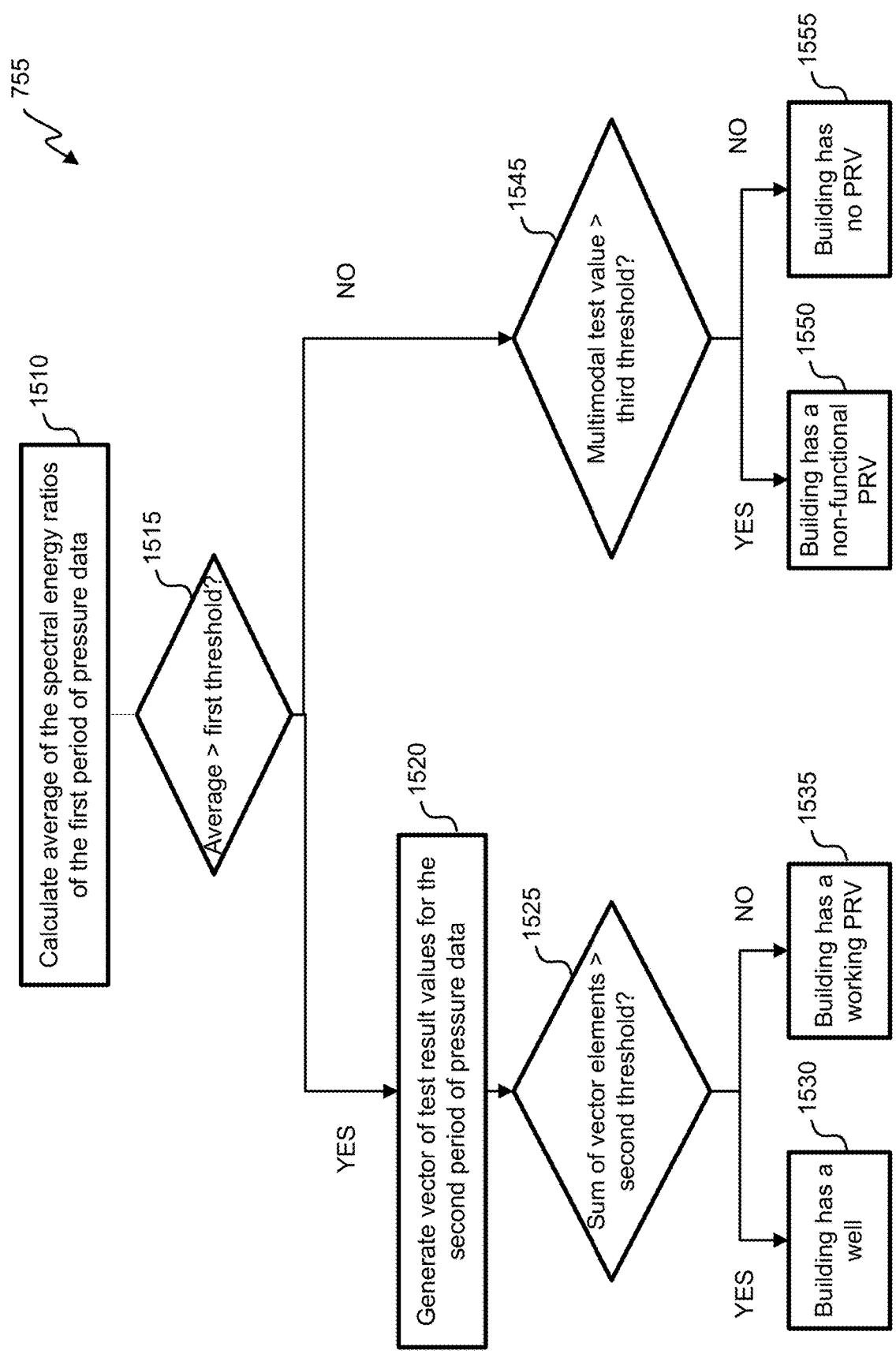
FIG. 15 depicts a flowchart of a method for determining a building type.

Referring next to FIG. 15, a flowchart of a method for determining a building type at block 755 is shown. In this example, the average of the spectral energy ratios of the silent period segments from the first period of pressure data 710 at a specific target frequency, such as 20 Hz, is calculated at block 1510. It is then determined whether the average is greater than a first threshold at block 1515. The first threshold may be any suitable value, such as 50%. Alternatively, a single spectral energy ratio from a single silent period may be compared to the first threshold at block 1515.

If the average of the spectral energy ratios is greater than the first threshold, the building has a well or a working PRV. To distinguish between these building types, a vector of test result values for the second period of pressure data 710 is generated at block 1520. The elements V(1)-V(4) of the vector V may be determined as follows, with the variables Multimodal_Test_Value, $S_1$, $S_2$, Skewness, $M_1$, and $M_2$ defined above:

$$V(1) = \begin{cases} 1, & \text{if Multimodal\_Test\_Value} < 70\% \\ 0, & \text{otherwise} \end{cases}$$

$$V(2) = \begin{cases} 1, & \text{if } S_1 > 0 \text{ and } S_2 > 0 \\ 0, & \text{otherwise} \end{cases}$$

$$V(3) = \begin{cases} 1, & \text{if Skewness} > 0 \\ 0, & \text{otherwise} \end{cases}$$

$$V(4) = \begin{cases} 1, & \text{if } M_1 > 5 \text{ and } M_2 > 5 \\ 0, & \text{otherwise} \end{cases}$$

The sum of the vector elements is then calculated as follows:

$$\text{Sum\_}V = V(1) + V(2) + V(3) + V(4) \quad (3)$$

It is then determined whether the sum of the vector elements is greater than a second threshold at block 1525. The second threshold may be any suitable value, such as 2. If the sum of the vector elements is greater than the second threshold, it is determined that the building has a well at block 1530. On the other hand, if the sum of the vector elements is less than or equal to the second threshold, it is determined that the building has a working PRV at block 1535. The vector elements and the second threshold may be modified in other embodiments.

On the other hand, if the average of the spectral energy ratios is determined to be less than or equal to the first threshold at block 1515, the building has a non-functional PRV or no PRV. To distinguish between these building types, it is determined whether the multimodal test value is greater than a third threshold at block 1545. The third threshold may be any suitable value, such as 90%. If the multimodal test value is greater than the third threshold, it is determined that the building has a non-functional PRV at block 1550. On the other hand, if the multimodal test value is less than or equal to the third threshold, it is determined that the building has no PRV at block 1535.

Figure 16:
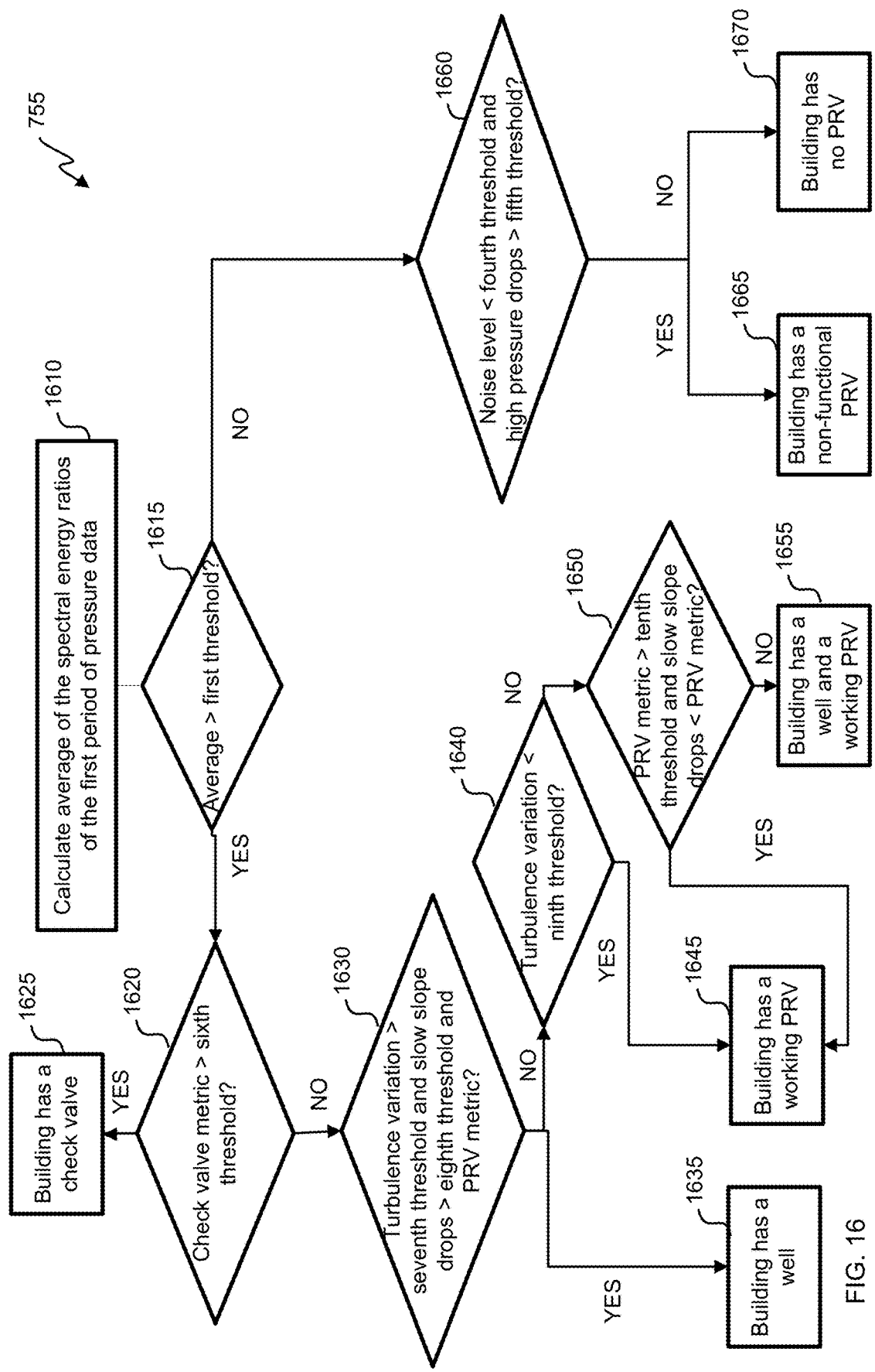
FIG. 16 depicts a flowchart of another method for determining a building type.

Referring next to FIG. 16, a flowchart of another method for determining a building type at block 755 is shown. In this example, the average of the spectral energy ratios of the silent period segments from the first period of pressure data 710 at a specific target frequency, such as 20 Hz, is calculated at block 1510. It is then determined whether the average is greater than a first threshold at block 1515. The first threshold may be any suitable value, such as 50%. Alternatively, a single spectral energy ratio from a single silent period may be compared to the first threshold at block 1515.

If the average of the spectral energy ratios is greater than the first threshold, it is determined whether the building has a check valve by determining whether a check valve metric is greater than a sixth threshold at block 1620. A check valve is a one-way switch that allows water to enter the building but not to leave the building. The check valve metric may be calculated by passing pressure data through a low pass filter, and then segmenting the filtered pressure data into segments of a temporal duration, such as 20 minutes. The pressure data may include the first period of pressure data 710, the second period of pressure data 730, and/or additional periods of pressure data that may include silent periods and non-silent periods. The check valve metric may be the 25th percentile of standard deviation values across the segments. If the check valve metric is greater than the sixth threshold, it is determined that the building has a check valve at block 1625. However, if the check valve metric is not greater than the sixth threshold, it is determined that the building does not have a check valve, and the method continues with block 1620. The sixth threshold may have any suitable value, such as 0.2-0.4. A similar determination may be performed to determine whether the building has a check valve in the method described in FIG. 15.

If the average of the spectral energy ratios is greater than the first threshold, and the building does not have a check valve, the building has a well or a working PRV. To distinguish between these building types, the variation in turbulence, the number of water events having a slow drop in slope, and the number of water events having a fast drop in slope in the pressure data may be analyzed.

Compared to building having a working PRV, buildings having a well exhibit more levels of steady state pressure values during silent periods. The variation in silent steady state pressure data may be determined by passing pressure data through a low pass filter, and then segmenting the filtered data into segments of a temporal duration, such as 5 minutes. The pressure data may include the first period of pressure data 710, the second period of pressure data 730, and/or additional periods of pressure data that may include silent periods and non-silent periods. The silent periods within the pressure data usually have a low variance. For example, low variance segments of the pressure data may be defined as segments whose variance is lower than the median variance value of all segments of the pressure data. The "low turbulence" variation is determined by calculating the deviation of pressure values across the low variance segments of the data.

In buildings having a well, water events appear in the pressure data as slow drops with a gradual slope. The number of such slow drops in the pressure data may be calculated. The pressure data may include the first period of pressure data 710, the second period of pressure data 730, and/or additional periods of pressure data that may include silent periods and non-silent periods. The number of slow drops may be calculated by determining the derivative of a down-sampled version of the smooth low pass filtered data. For example, the pressure data may be down-sampled with a two-second sampling rate. A slow drop may be identified as having a small negative derivative value for a continuous period exceeding a temporal duration. For example, the small negative derivative value may be between −0.1 and −0.05 for at least 20-30 seconds.

Unlike buildings having a well, buildings having a working PRV have water events with fast and sharp drops in the pressure data. The number of such drops in the pressure data may be calculated. The pressure data may include the first period of pressure data 710, the second period of pressure data 730, and/or additional periods of pressure data that may include silent periods and non-silent periods. The number of fast drops may be calculated by determining the derivative of a down-sampled version of the smooth low pass filtered data. A fast drop may be identified as having a large negative derivative value for a continuous period less than a temporal duration. For example, the large negative derivative value may be between 2 and 5 for at least 5-10 seconds. The number of such drops in the pressure data is referred to herein as the PRV metric.

It is determined whether the variation in low turbulence is greater than a seventh threshold at block 1630. The seventh threshold may have any suitable value, such as 2-3 psi. It is also determined whether the number of slow slope drops is greater than an eighth threshold and the PRV metric at block 1630. The eighth threshold may be any suitable integer, such as 5, 6, 7, 8, 9, or 10. The PRV metric may be any suitable integer greater than or equal to 0. If all of these conditions are true, it is determined that the building has a well at block 1635. On the other hand, if at least one of these conditions is false, it is determined whether the variation in turbulence is less than a ninth threshold at block 1640. The ninth threshold may have any suitable value, such as 1 psi. If the variation in low turbulence is less than the ninth threshold, it is determined that the building has a working PRV at block 1645. On the other hand, if the variation in low turbulence is not less than the ninth threshold, it is determined whether the PRV metric is greater than a tenth threshold and the number of slow slope drops is less than the PRV metric at block 1650. The tenth threshold may be any suitable integer, such as 5, 6, 7, 8, 9, or 10. If both of these conditions are true, it is determined that the building has a working PRV at block 1645. On the other hand, if at least one of these conditions is false, it is determined that the building has a well and a working PRV at block 1655.

If the average of the spectral energy ratios is determined to be less than or equal to the first threshold at block 1515, the building has a non-functional PRV or no PRV. To distinguish between these building types, the noise level and the number of high pressure drops may be analyzed.

Pressure data in buildings with a non-functional PRV have lower noise compared to buildings with no PRV. In order to determine the noise level, the pressure data is segmented into segments of a temporal duration, such as 5 minutes. The pressure data may include the first period of pressure data 710, the second period of pressure data 730, and/or additional periods of pressure data that may include silent periods and non-silent periods. The noise level is calculated as the 10th percentile of the standard deviation of the segments. In order to determine the number of high pressure drops, the pressure data is segmented into segments of a temporal duration, such as 5 minutes. Segments having high variances may be selected, and a histogram-based test such as the multimodal distribution test described above may be performed to determine if each high variance segment has a multimodal distribution shape. The histogram-based test may be used to determine whether there are distinct distinguishable drops in the pressure data. The histogram-based test may be performed on high variance segments, which are segments having a standard deviation value that is greater than the median standard deviation value of all segments plus a fixed value, such as 0.5-1 psi. The number of high pressure drops is counted as the number of drops within the high variance segments that meet the histogram-based test.

It is determined whether the noise level is less than a fourth threshold and the number of high pressure drops is greater than a fifth threshold at block 1545. The fourth threshold may be any suitable value, such as 0.3-0.5. The fifth threshold may any suitable integer, such as 2, 3, 4, or 5. If both of these conditions are true, it is determined that the building has a non-functional PRV at block 1665. On the other hand, if at least one of these conditions is false, it is determined that the building has no PRV at block 1670.

A number of variations and modifications of the disclosed embodiments can also be used. For example, the plumbing analyzer can be used to monitor any liquid distributed in pipes. This could include industrial plants, sprinkler systems, gas distribution systems, refineries, hydrocarbon production equipment, municipal water distribution, etc. The plumbing system is a closed system with pressurized liquid (e.g., a gas) that is released in a selective and controlled manner using valves.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method comprising:
   determining a spectral energy ratio as a function of first pressure data acquired during a first time period in which a water flow through a plumbing system of a building is below a flow threshold;
   determining a multimodal test value as a function of second pressure data acquired during a second time period that includes at least some time during which the water flow through the plumbing system is greater than or equal to the flow threshold;
   identifying a type of the plumbing system of the building as a function of the spectral energy ratio and the multimodal test value, wherein the first pressure data and the second pressure data is analyzed to determine the type of the plumbing system has a working pressure reducing valve (PRV), no PRV, a well, a check value, and/or a non-functional PRV based on a comparison with the flow threshold;
   in response to identifying the type of plumbing system of the building, determining at least one water analysis system status including instantaneous water usage, water usage over a time period, or one or more error conditions including one or more of water leaks, running toilets, missing PRV, defective PRV, water bill estimates, low pressure, water heater malfunction, or well pump issues related to the plumbing system; and displaying, on a point interface, at least the determined water analysis system status for further action.

2. The method as recited in claim 1, wherein the type of the plumbing system of the building is identified as a system that includes a working pressure reducing valve (PRV), a non-functional PRV, no PRV, a well, or a check valve.

3. The method as recited in claim 1, further comprising:
analyzing a slope of the second pressure data;
determining a skewness of the second pressure data; and
determining a median divergence of the second pressure data,
wherein the type of the plumbing system is identified as a function of the spectral energy ratio, the multimodal test value, the slope, the skewness, and the median divergence.

4. The method as recited in claim 1, wherein the spectral energy ratio is determined as a numerator divided by a denominator, the numerator is a portion of energy of the first pressure data within a first frequency band from 0 Hz to a target frequency, and the denominator is a total energy of the first pressure data.

5. The method as recited in claim 1, wherein the multimodal test value is determined as a function of a difference between two peaks of a histogram of the second pressure data and a minimum between the two peaks.

6. The method as recited in claim 1, wherein the first time period at least partially overlaps with the second time period.

7. The method as recited in claim 1, wherein if the spectral energy ratio is above a first threshold, the type of plumbing system is identified as a system that includes a well or a working PRV.

8. The method as recited in claim 7, wherein if the spectral energy ratio is equal to or below the first threshold, the type of plumbing system is identified as a system that includes a non-functional PRV or no PRV.

9. A method comprising:
determining a spectral energy ratio as a function of first pressure data acquired during a first time period in which a water flow through a plumbing system of a building is below a flow threshold;
determining at least one metric as a function of second pressure data acquired during a second time period that includes at least some time during which the water flow through the plumbing system is greater than or equal to the flow threshold;
identifying a type of the plumbing system of the building as a function of the spectral energy ratio and the metric, wherein the first pressure data and the second pressure data is analyzed to determine the type of the plumbing system has a working pressure reducing valve (PRV), no PRV, a well, a check value, and/or a non-functional PRV based on a comparison with the flow threshold;

in response to identifying the type of plumbing system of the building, determining at least one water analysis system status including instantaneous water usage, water usage over a time period, or one or more error conditions including one or more of water leaks, running toilets, missing PRV, defective PRV, water bill estimates, low pressure, water heater malfunction, or well pump issues related to the plumbing system; and displaying, on a point interface, at least the determined water analysis system status for further action.

10. The method as recited in claim 9, wherein the type of the plumbing system of the building is identified as a system that includes a working pressure reducing valve (PRV), a non-functional PRV, no PRV, a well, or a check valve.

11. The method as recited in claim 9, wherein the at least one metric includes at least one of:
a check valve metric that is a function of the second pressure data,
a variation in turbulence of the second pressure data,
a number of slow slope drops in the second pressure data,
a number of fast slope drops in the second pressure data,
a noise level of the second pressure data, or
a number of high pressure drops in the second pressure data.

12. The method as recited in claim 9, wherein the spectral energy ratio is determined as a numerator divided by a denominator, the numerator is a portion of energy of the first pressure data within a first frequency band from 0 Hz to a target frequency, and the denominator is a total energy of the first pressure data.

13. The method as recited in claim 9, wherein the first time period at least partially overlaps with the second time period.

14. The method as recited in claim 9, wherein if the spectral energy ratio is above a first threshold, the type of plumbing system is identified as a system that includes at least one of a check valve, a well, or a working PRV.

15. The method as recited in claim 14, wherein if the spectral energy ratio is equal to or below the first threshold, the type of plumbing system is identified as a system that includes a non-functional PRV or no PRV.

* * * * *